(12) United States Patent
Mielekamp

(10) Patent No.: US 7,330,573 B2
(45) Date of Patent: Feb. 12, 2008

(54) VISUALIZATION OF MEDICAL IMAGES

(75) Inventor: Pieter Maria Mielekamp, Eindhoven (NL)

(73) Assignee: Koninklijke Philips Electronics, N.V., Eindhoven (NL)

(*) Notice: Subject to any disclaimer, the term of this patent is extended or adjusted under 35 U.S.C. 154(b) by 868 days.

(21) Appl. No.: 10/372,067

(22) Filed: Feb. 21, 2003

(65) Prior Publication Data

US 2004/0165756 A1    Aug. 26, 2004

(51) Int. Cl.
*G06K 9/00* (2006.01)
(52) U.S. Cl. ...................... 382/128; 128/922
(58) Field of Classification Search ............... 382/100, 382/128–132, 190, 195, 199, 260–265; 128/922; 708/300
See application file for complete search history.

(56) References Cited

U.S. PATENT DOCUMENTS

| | | | | |
|---|---|---|---|---|
| 5,425,368 A | * | 6/1995 | Brandt | 600/408 |
| 5,832,134 A | * | 11/1998 | Avinash et al. | 382/257 |
| 6,195,579 B1 | | 2/2001 | Carroll et al. | |
| 6,292,683 B1 | | 9/2001 | Gupta et al. | |
| 6,504,524 B1 | | 1/2003 | Gates et al. | |
| 7,020,314 B1 | * | 3/2006 | Suri et al. | 382/130 |

FOREIGN PATENT DOCUMENTS

| | | |
|---|---|---|
| EP | 0536744 | 4/1993 |
| EP | 0573822 | 5/1993 |
| FR | 2 819 918 | 7/2002 |
| WO | WO2003079324 | 9/2003 |

* cited by examiner

*Primary Examiner*—Bhavesh M Mehta
*Assistant Examiner*—Anand Bhatnagar

(57) ABSTRACT

A method of producing a resultant object data set is presented in which a reference object data set and a contrast object data set containing extrinsic contrast information are both provided. Both object data sets contain information describing the same part of the body. Extrinsic contrast information from the contrast object data set is segmented to produce a segmented data set and this data is dilated to produce a dilated data set. A mask is then created from the dilated data set and the reference object data set is filtered by the mask to produce a resultant object data set. Sometimes a further method is found to be useful, in which information which occurs in both object data sets is segmented from the reference object data set to produce a data set which is used to create a further mask for filtering.

4 Claims, 3 Drawing Sheets

VISUALIZATION OF MEDICAL IMAGES

The invention relates to a method of producing a resultant object data set.

Modern diagnostic imaging methods coupled with digital image manipulation techniques allow the visualization of greater numbers of pathological conditions. In particular, angiographic techniques allow the visualization of pathology relating to the arterial blood supply. Such pathology includes arterial stenoses, or arterial narrowings, which restrict the flow of blood along the arterial vessel and so also restrict the supply of blood to tissue which is perfused from parts of the arterial tree which are distal to the stenosis. Stenoses are usually built up from deposits of matter on the inside of the arterial wall, such deposits being referred to in-situ as plaque, and the range of their properties makes their correct identification and diagnosis a challenge. Contrast techniques have been developed to assist in the identification of various forms of stenoses. For example, in the technique of digital subtraction angiography, two images of the part of the arterial vessel tree which is of interest are taken, one without any further, or extrinsic, contrast medium administered to the patient, and one in which a contrast agent is present. The contrast agent is usually administered through an injection site. The two resulting images both show the same overlying bony structures surrounding that part of the arterial tree which is of interest, but only the image containing the contrast agent shows the arterial tree itself with sufficient clarity for it to be visualized. Digital subtraction of the image without contrast agent from the image with contrast agent results in an image of the contrast enhanced arterial tree rendered clearly visible without the overlying, obscuring bony structures.

Other techniques are also possible and often use various forms of digital manipulation. For example, U.S. Pat. No. 5,832,134 discloses a method in which an initial object data set containing contrast information from an angiogram is manipulated to produce a final object data set which provides the viewer with visual information about the angiographic data, unobstructed by overlying structures of a similar pixel intensity.

The method of the prior art achieves this by segmenting the overlying structures from the object data set through a thresholding process based on the intensity value of individual voxels within the image, connecting these segmented structures and dilating the connected group of voxels to produce a mask which is then used to remove the overlying structures from the original data set.

However, in applying this method to some images the method disclosed in U.S. Pat. No. 5,832,134 sometimes displays overlying structures which are not of interest.

It is an object of the invention to provide an improved method of removing overlying structures which does not depend on the identification and segmentation of the overlying bony structures.

This is achieved according to the method of the invention wherein:
  a reference object data set is provided,
  a contrast object data set comprising extrinsic contrast information is provided,
  the extrinsic contrast information within the contrast object data set is segmented to produce a segmented data set containing voxels representing the extrinsic contrast information,
  the data in the segmented data set is dilated to produce a dilated data set,
  a mask is created from the dilated data set,
  the reference object data set is filtered by the mask to produce the resultant object data set.

An object data set can be thought of as simply a matrix of values representing image data which corresponds to physical properties of the image subject at different points within the body of the 3 dimensional subject. To display an image of this 3 dimensional subject, all points within the object data set are translated into image voxels within a 3 dimensional image object data set and can further be displayed as image pixels within a 2 dimensional image derived from the 3 dimensional image object data set. Ultimately, the pixels are displayed with characteristics which encode the values of the original image data. For example, an object data set containing the results of an X-ray tomographic acquisition is actually a 3 dimensional matrix array of values representing the tissue transparency to X rays at every equivalent point within the original body. When these are displayed, the different values are represented by different visual intensities on the display screen. Traditionally, pixels representing tissue with a high transparency to X rays are rendered in lower intensities on the display screen, with the effect that such tissue appears dark on the resulting image. In a black and white image such tissue would be presented with a darker grey value. Pixels representing tissue which has a low transparency to X rays, that is tissue which absorbs higher amounts of the X rays, are rendered with higher intensities, with the corresponding result that such tissue appears light on the resulting image. In a black and white image, such tissue would be presented with a lighter grey value, the very high intensities being rendered as white.

The main source of contrast within any X ray image is the variable absorption of X rays between different body tissues. Bony tissue, being calcified, absorbs X radiation relatively well and so is usually rendered with pixels of a lighter grey value, in stark contrast to the surrounding soft tissue rendered using pixels of a darker grey value. The various types of soft tissue, however, do not have such a large relative contrast in comparison to each other and the differences between separate soft tissues do not show up as clearly on an unmodified X ray image. Extrinsic contrast agents which absorb X rays to a much greater extent than soft tissue can be used to image anatomy which would otherwise remain indistinct. The contrast data shows up brightly in the resulting image and is able to carry visual information about the anatomical structures where the contrast agent is residing. For example, contrast agent contained within the arterial system of a subject shows up on the resultant X ray in the shape of the lumen, or cavity, of the arteries in which it is held.

According to the method of the invention as described in claim 1, an object data set of image data acquired with an extrinsic contrast agent present is subjected to a segmenting process which identifies within that object data set the regions, or groups of voxels, describing contrast data. The segmentation by which these voxels are identified can be implemented using a thresholding process or by any other method known to those who are skilled in the art. A typical thresholding process uses the application of a value, often referred to as a threshold value, to the object data set to act as a cut-off point and identify all values in the object data set which are, say, above or below the threshold value.

The result of segmenting the original contrast object data set to identify the contrast voxels produces a new object data set containing only those voxels which represent contrast information. But since the original contrast agent is contained within the blood vessels of the patient, these voxels also provide an image of the blood vessels as they are situated within the image.

For the next stage in the method of the invention the contrast voxels within the segmented object data set are dilated. This is a process by which the volume, within the data set, represented by the voxels is increased. In the case of angiographic data this is equivalent to dilating the arterial vessels outwards as though they were expanded widthways.

This data set of dilated data, known here as the dilated data set, is used to produce a mask. A mask, as is known to those skilled in the art, is a set of data points which act as a filter, selection or gateway when applied to another set of data points, indicating which of the data points from that other set of data points are to be displayed. The data points of the mask itself can be, for example, unity or zero, as is known to those skilled in the art. When the mask is applied to the set of data points in the object data set the mask values work on the corresponding data points of the data set and produce a new set of data values which are now zero at all points corresponding to, say, the zero values in the mask, but have the original data points from the object data set at all points in the object data set corresponding to the points in the mask where the value is unity. It can be seen in this way that any values of the object data set to which the value of zero is applied become themselves zero and are subsequently not displayed. Any values of the object data set to which the non-zero values are applied survive the masking process and are subsequently displayed in their original positions.

In the method of the invention, the mask is constructed from the dilated data set in such a way that the values of the mask are, say, unity for all points of the mask which correspond to points in the dilated data set which are represented by the dilated contrast data. All other points in the mask are set to, say, zero.

The mask can therefore act as a filter to select from the original data set those voxels in which reside information describing the blood vessel tree of the patient and the tissue area immediately around this tree. In effect, a method has been found to differentiate between the angiographic areas of interest and any overlying structure in such a way that does not depend on first identifying and selecting the overlying areas. If a further object data set is obtained of the same part of the body of the patient and the mask then applied to it, the areas away from the arterial tree will be filtered out of the image and the result will be a final object data set containing only information in and around the corresponding area in the contrast object data set where the contrast agent was present.

Therefore in the final step of the invention the mask is applied to another object data set, a reference object data set, containing image data acquired without contrast information. In practice this reference object data set is acquired according to the normal imaging process but without the use of any extrinsic, or external, contrast agent. It is acquired from the same part of the body as the contrast object data set, the principle being that it contain the same section of the blood vessel tree that is contained in the contrast object data set and which is therein suffused with contrast agent.

The resultant object data set, which is the final product of the invention, contains the original image voxel data, but without the data representing the overlying bony structures. It is found that the method of the invention produces a solution to an extra problem that the prior art cannot solve. In some pathologies it is possible for plaque which has built up on the inside of the vessel wall to become calcified. This so called hyperdense calcified plaque can be imaged and displayed with rotational X-ray apparatus, such as a C-arm, using low kV values. However, the pixel intensity values with which the hyperdense calcified plaque are displayed in the resultant images are in the same range as the pixel intensity values of any other calcified structures included in the image. The biggest single group of calcified structures are the bones that make up the skeletal system. If ordinary digital subtraction techniques, as described earlier, are used to remove the overlying bones from an image data set containing an arterial tree in which hyperdense calcified plaque is situated on the arterial walls, then the thresholding process would identify and remove the hyperdense calcified plaque from the resulting image along with the overlying bones.

Prior art document U.S. Pat. No. 5,832,134 suffers from the same drawback. The thresholding process automatically includes any high density plaque in the segmentation step and therefore removes it from the final image. This removal of high density plaque from the final image denies the viewer vital information which is of diagnostic value.

The method of the invention, as described above, in using the segmentation of the contrast information to construct a mask with which to filter a reference object data set is, in effect, using anatomical position as a differentiator, instead of the more normal voxel intensity. Any image produced from the resultant object data set contains the arteries of interest, complete with any hyperdense calcified plaque, and without any overlying and obscuring bony structures.

There is an extra process which may be useful within the overall method of the invention in order to maximize the advantages of the invention. This extra process is defined in claim 2. It is possible for plaque to be very calcified and dense to such an extent that it appears on the image produced from the object data set containing the contrast information with at least as great an intensity as the voxels describing the distribution of the contrast. It is also possible for some bony structures to have a similar very high density to such an extent that they also appear with a similar intensity in the initial contrast image. Both are therefore included in the segmentation of the contrast information by the segmentation process and are included in the object data set that forms the basis of the dilation in the subsequent dilation process. In effect, they will form the source of islands of data which will be let through by the masking process and will show up in the eventual resultant object data set. Because their initial inclusion in the segmentation process is dependent on their high intensity value they will, by their very nature, constitute obscuring, overlying material when they thus appear in the final image.

This problem can be avoided by segmenting the high density voxels via a normal segmentation process from the reference object data set acquired without contrast, using this segmentation to form a mask and applying this mask to the initial contrast segmentation. This has the effect of removing any very high density structures from the segmentation. The method of the invention can then proceed as explained above with the dilation and masking processes.

The invention as described provides a powerful solution to the problem of adequately displaying the object of interest without also displaying overlying objects which are not of interest. It is ultimately these vessels which are of interest to the viewer, so the manipulation of this vessel map to produce a resulting image has a clear advantage over the production of a resulting image starting with the identification of the tissue that is to be ultimately excluded.

The invention also relates to a computer program comprising instructions to process a contrast object data set comprising extrinsic contrast information. Such a computer program has the advantage that it can carry out the method of the invention.

The invention also relates to a workstation comprising instructions to process a contrast object data set comprising extrinsic contrast information. Such a workstation has the advantage that it can carry out the method of the invention.

These and other aspects of the invention are demonstrated in the following figures.

Figure 1:
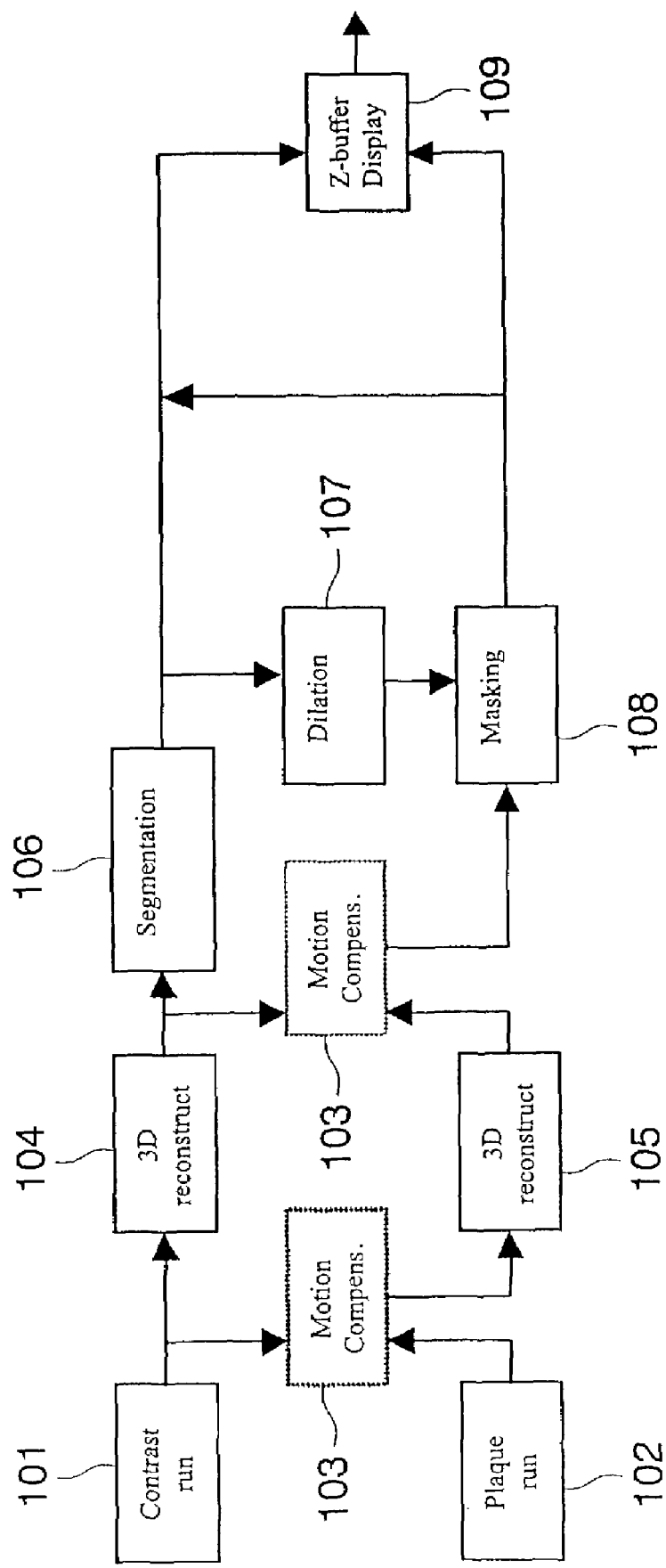
FIG. 1 shows a flow diagram which demonstrates the steps comprised within the invention.

FIG. 1 shows a flow diagram describing how the invention would be implemented in practice in relation to an angiogram. Two object data sets are acquired from two separate imaging runs, one run with a contrast agent 101, referred to earlier as the contrast object data set, and one without 102, referred to earlier as the reference object data set. The two data sets thereby obtained are registered for motion compensation 103, such motion usually being the result of the patient having moved slightly between the acquisition of both data sets, and are reconstructed, 104 and 105. The registration for motion compensation may occur before or after reconstruction as is known to those skilled in the art and is not the subject of this invention.

The object data set containing the contrast information is subjected to the segmentation procedure 106 and the resulting data set, the segmented data set, is dilated 107 to produce the basic volumetric information for the mask. The masking procedure 108 then takes place in which the mask is applied to the non contrast object data set 102, that is, the reference object data set. Finally, the resultant object data sets undergoes a display process 109 as would be known and understood to those skilled in the art.

Figure 2:
FIG. 2 shows angiographic image data containing contrast information and overlying structures that have a similar pixel intensity.

FIG. 2 shows an example of a reconstructed object data set following a contrast run. The resultant image shows contrast filled arterial vessel, deposits of hyperdense calcified plaque on the walls of those vessels, and overlying bony tissue. A thresholding process, by which image voxels with an intensity value above a certain threshold are removed, cannot solve the problem of how to display the hyperdense calcified plaque without also displaying the obscuring bony structures. In these instances in which the plaque is hyperdense due to calcification, it is not be possible to find a threshold value which differentiates between the level of visual intensity with which the bones are displayed and the level of visual intensity with which the calcified plaque is displayed. Any thresholding process which removes the bones from the image, automatically removes the hyperdense calcified plaque at the same time. This image is an ideal example of the sort of visual image data which would benefit from the method of the invention.

Figure 3:
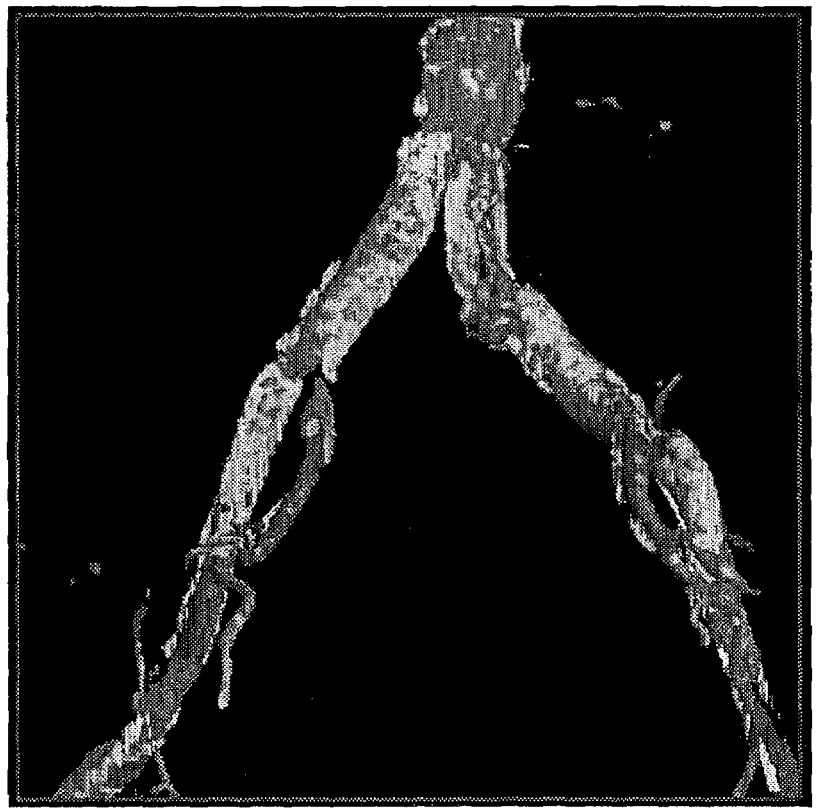
FIG. 3 shows the same angiographic image data containing contrast information with the overlying structures removed by the method of the invention.

FIG. 3 shows an image from the same object data set as displayed in FIG. 2, but after the application to the object data set of the method of the invention. It is immediately apparent that the method of the invention has removed the obscuring bony tissue, leaving a clear view of the arterial structures.

Figure 4:
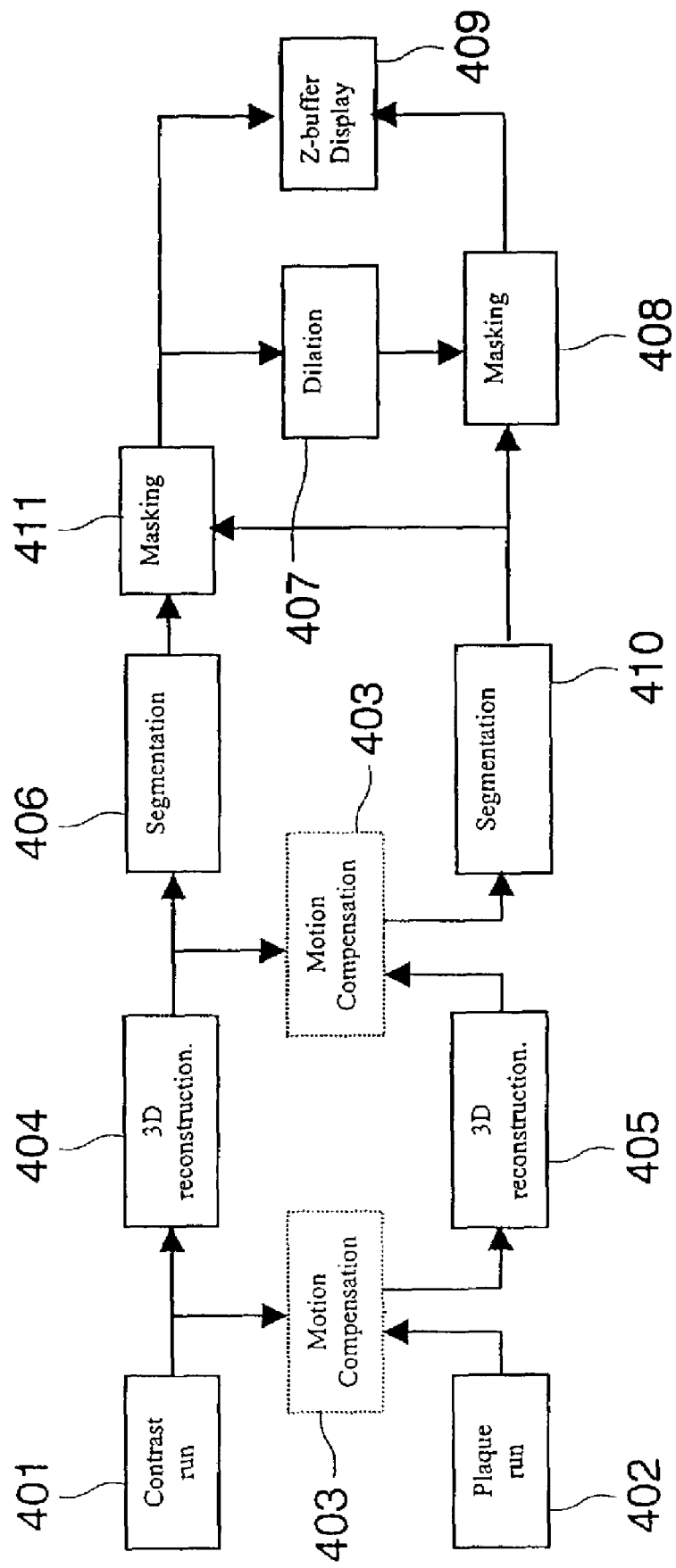
FIG. 4 shows a flow diagram which demonstrates the steps of the invention when the extra process of filtering out any very high intensity calcified tissue from the initial contrast image is undertaken.

FIG. 4 shows a flow diagram describing how the invention may be modified when there is very high density plaque or very high density bony tissue present in the image, as occasionally happens in clinical practice. Again, two object data sets are acquired from two separate imaging runs, one run with a contrast agent 401, the contrast object data set, and one without 402, the reference object data set. The two data sets are registered for motion compensation 403, which may occur before or after reconstruction, 404 and 405. The object data set containing the contrast information is subjected to the segmentation procedure 406. At this point it may become apparent that there are very high density voxels in the two object data sets 401 and 402. These will then be segmented alongside the normal contrast information, be dilated and included in the mask. A normal digital subtraction procedure as is common in the art and is described above will not produce an adequate result because modern techniques for visualizing hyperdense calcified plaque utilize different kVp values for the X ray apparatus on each of the contrast and non contrast run. The result of this is that the very high density voxels are seen on each image with a different intensity and so cannot undergo a simple subtraction process. However, if the non contrast object data set 402 is now subjected to a segmentation process 410, which segments out this high density information, a mask based on this segmented data can be made and applied 411 to the segmented data set. The mask again acts as a filter, this time filtering out that very high density information which is present in the two object data sets. The object data set which results from this extra masking process can now undergo the remainder of the method of the invention, as before.

Thus, the resulting data set is dilated 407 to produce the basic volumetric information for the mask. The masking procedure 408 takes place in which the mask is applied to the non contrast object data set 402. Finally, the resultant object data sets undergo a display process 409 as would be known and understood to those skilled in the art.

It can be seen that the method of the invention allows the display of very important information and offers a powerful procedure by which high density image data which is the focus of an investigation can be differentiated from high density image data which is not.

The invention claimed is:

1. A method of producing a resultant object data set, which method does not depend on identification and segmentation of overlying bony structures, wherein, a reference object data set is provided, wherein the reference object data set is a matrix of values representing image data which corresponds to physical properties of a three dimensional image subject at different points within the body of the subject, a contrast object data set comprising extrinsic contrast information is provided, the extrinsic contrast information within the contrast object data set is segmented to produce a segmented data set containing only those voxels representing the extrinsic contrast information, the data in the segmented data set is dilated to produce a dilated data set, a mask is created from the dilated data set in such a way that the values of the mask are uniform for all points of the mask which correspond to points in the dilated data set which are represented by the dilated contrast data, and the reference object data set is filtered by the mask to produce the resultant object data set, wherein segmentation of the contrast information to construct a mask with which to filter the reference object data set enables differentiation of physical properties within the body of the subject based upon anatomical position, wherein a three dimensional image of the subject is displayed when all points within the object data set are translated into image voxels within a three dimensional image object data set, and wherein a two dimensional image of the subject may be derived from the three dimensional image object data set.

2. A method as claimed in claim 1, wherein, information which occurs in both the reference object data set and the contrast object data set is segmented from the reference object data set to produce a reference segmented data set, a further mask is created from the reference segmented data set, the segmented data set acquired from the contrast object data set is filtered by the further mask before it undergoes dilation to produce the dilated data set.

3. A computer-readable storage medium storing a program for the processing of a three-dimensional image comprising, instructions to produce a resultant object data set, wherein the reference object data set is a matrix of values representing image data which corresponds to physical properties of a three dimensional image subject at different points within the body of the subject, wherein it also contains instructions to:

accept a reference object data set, accept a contrast object data set comprising extrinsic contrast information, segment the extrinsic contrast information from within the contrast object data set to produce a segmented data set containing voxels representing the extrinsic, contrast information, dilate the data in the segmented data set to produce a dilated data set, create a mask using the dilated data set in such a way that the values of the mask are uniform for all points of the mask which correspond to points in the dilated data set which are represented by the dilated contrast data, and produce a resultant object data set by filtering the reference object data set using the mask, wherein segmentation of the contrast information to construct a mask with which to filter the reference object data set enables differentiation of physical properties within the body of the subject based upon anatomical position.

4. A workstation, comprising instructions to produce a resultant object data set whereby it also contains instructions to:

accept a reference object data set, wherein the reference object data set is a matrix of values representing image data which corresponds to physical properties of a three dimensional image subject at different points within the body of the subject, accept a contrast object data set comprising extrinsic contrast information, segment the extrinsic contrast information from within the contrast object data set to produce a segmented data set containing voxels representing the extrinsic contrast information, dilate the data in the segmented data set to produce a dilated data set, create a mask using the dilated data set in such a way that the values of the mask are uniform for all points of the mask which correspond to points in the dilated data set which are represented by the dilated contrast data, and produce a resultant object data set by filtering the reference object data set using the mask, wherein segmentation of the contrast information to construct a mask with which to filter the reference object data set enables differentiation of physical properties within the body of the subject based upon anatomical position.

* * * * *